US012591803B2

(12) United States Patent
Robinson et al.

(10) Patent No.: US 12,591,803 B2
(45) Date of Patent: Mar. 31, 2026

(54) SYSTEMS AND METHODS FOR APPLYING MACHINE LEARNING BASED ANOMALY DETECTION IN A CONSTRAINED NETWORK

(71) Applicant: STEERING SOLUTIONS IP HOLDING CORPORATION, Saginaw, MI (US)

(72) Inventors: Bernard C. Robinson, Saginaw, MI (US); Peter D. Schmitt, Auburn Hills, MI (US); Jonathan Hirscher, Auburn Hills, MI (US); Owen K. Tosh, Saginaw, MI (US); Michael R. Story, Saginaw, MI (US); Emilio Quaggiotto, Saginaw, MI (US); Joachim J. Klesing, Auburn Hills, MI (US); Andrew J. Frank, Auburn Hills, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 1016 days.

(21) Appl. No.: 17/724,539

(22) Filed: Apr. 20, 2022

(65) Prior Publication Data

US 2023/0342656 A1    Oct. 26, 2023

(51) Int. Cl.
*G06N 20/00* (2019.01)
*B60W 10/20* (2006.01)
(Continued)

(52) U.S. Cl.
CPC ............. *G06N 20/00* (2019.01); *B60W 10/20* (2013.01); *B60W 50/029* (2013.01);
(Continued)

(58) Field of Classification Search
CPC ........................... B60W 2510/20; G06N 20/00
See application file for complete search history.

(56) References Cited

U.S. PATENT DOCUMENTS 10,665,109 B1 * 5/2020 Simon .............. G08G 1/096791
2012/0130674 A1 * 5/2012 Fisher ................. B62D 5/0481
                                                                702/151

(Continued)

OTHER PUBLICATIONS

Maksimychev, O. I., E. N. Matiukhina, A. V. Ostroukh, and Y. E. Vasiliev. "Connected Vehicle Remote Diagnostic System." In 2021 Systems of Signals Generating and Processing in the Field of on Board Communications, pp. 1-5. IEEE, 2021. (Year: 2021).*

*Primary Examiner* — Matthew Ell
*Assistant Examiner* — Pedro J Morales
(74) *Attorney, Agent, or Firm* — Dickinson Wright PLLC

(57) ABSTRACT

A method for signal anomaly detection includes receiving at least one signal and determining, using at least one machine learning anomaly detection model, whether a value associated with the at least one signal is within a range of an expected value. The method also includes, in response to a determination that the value associated with the at least one signal is not within the range of the expected value, incrementing a counter, and, in response to a determination that a value of the counter is greater than or equal to a threshold value, identifying, based on the at least one signal, signal anomaly information. The method also includes communicating the signal anomaly information to a remote computing device, receiving, from the remote computing device, diagnostics information responsive to the signal anomaly information, and, in response to receiving the diagnostics information, initiating at least one corrective action procedure.

20 Claims, 4 Drawing Sheets

(51) Int. Cl.
    *B60W 50/029*     (2012.01)
    *G07C 5/08*     (2006.01)

(52) U.S. Cl.
    CPC ......... *G07C 5/0808* (2013.01); *G07C 5/0841*
                 (2013.01); *B60W 2510/20* (2013.01)

(56)              References Cited

U.S. PATENT DOCUMENTS

| | | | | |
|---|---|---|---|---|
| 2014/0195576 A1* | 7/2014 | Kaplan | ................... | G06F 7/588 |
| | | | | 708/250 |
| 2016/0062815 A1* | 3/2016 | Ivanova | .............. | G06F 11/3072 |
| | | | | 714/26 |
| 2019/0050515 A1* | 2/2019 | Su | .......................... | G06N 3/045 |

* cited by examiner

MOST
MEDIA ORIENTED SYSTEMS TRANSPORT
ETHERNET AVB (AUDIO VIDEO BRIDGING)
ETHERNET TSN (TIME-SENSITIVE NETWORKING)

28

LIN
LOCAL INTERCONNECT NETWORK
MULTIFUNCTION KEYLESS SYSTEM

32

CAN
CONTROLLER AREA NETWORK
COLLISION DETECTION SYSTEM

18

14

22

12

26

20

FlexRay
BRAKE-BY-WIRE SYSTEM

30

ETHERNET

24

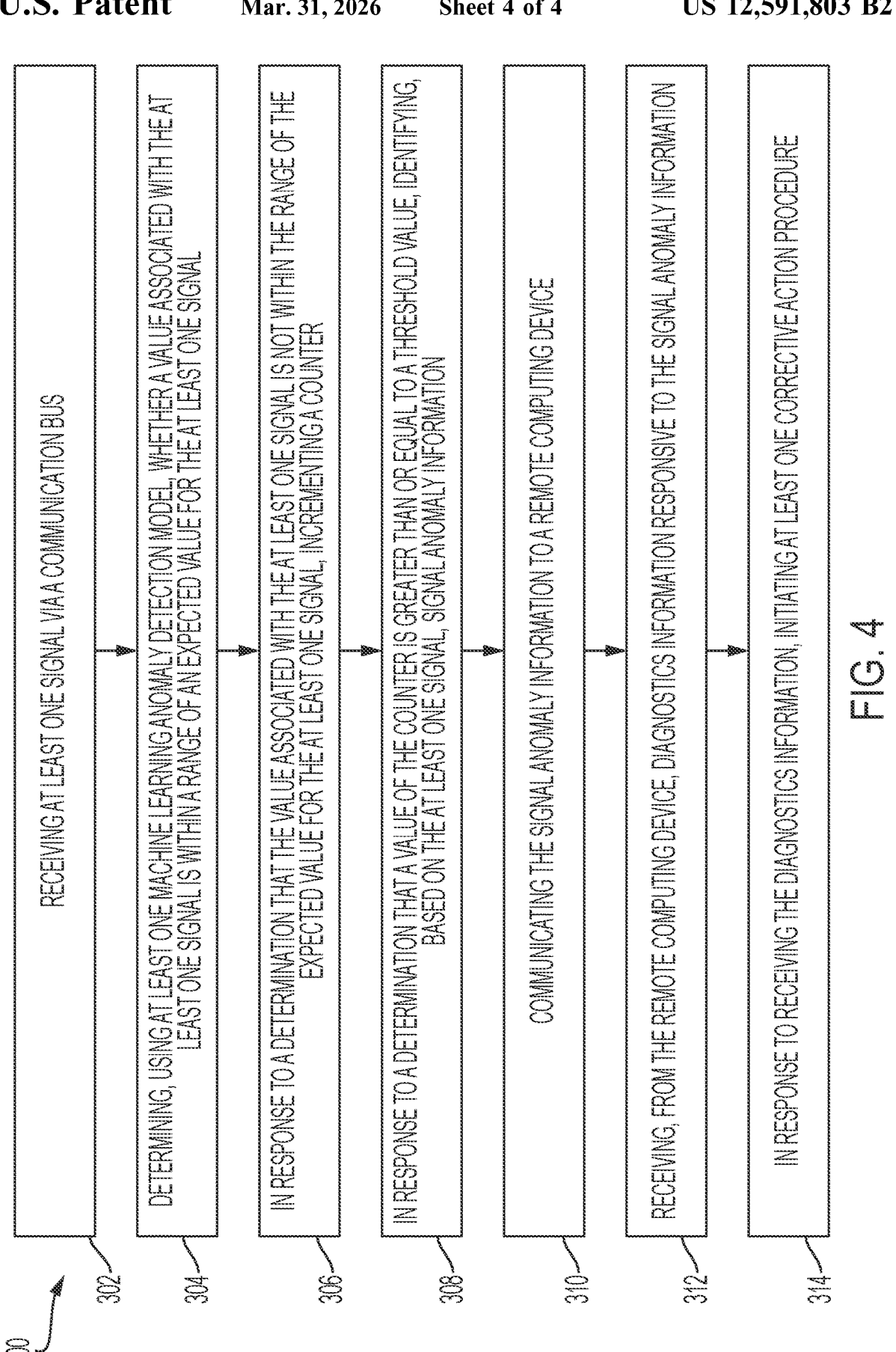

302 — RECEIVING AT LEAST ONE SIGNAL VIA A COMMUNICATION BUS

304 — DETERMINING, USING AT LEAST ONE MACHINE LEARNING ANOMALY DETECTION MODEL, WHETHER A VALUE ASSOCIATED WITH THE AT LEAST ONE SIGNAL IS WITHIN A RANGE OF AN EXPECTED VALUE FOR THE AT LEAST ONE SIGNAL

306 — IN RESPONSE TO A DETERMINATION THAT THE VALUE ASSOCIATED WITH THE AT LEAST ONE SIGNAL IS NOT WITHIN THE RANGE OF THE EXPECTED VALUE FOR THE AT LEAST ONE SIGNAL, INCREMENTING A COUNTER

308 — IN RESPONSE TO A DETERMINATION THAT A VALUE OF THE COUNTER IS GREATER THAN OR EQUAL TO A THRESHOLD VALUE, IDENTIFYING, BASED ON THE AT LEAST ONE SIGNAL, SIGNAL ANOMALY INFORMATION

310 — COMMUNICATING THE SIGNAL ANOMALY INFORMATION TO A REMOTE COMPUTING DEVICE

312 — RECEIVING, FROM THE REMOTE COMPUTING DEVICE, DIAGNOSTICS INFORMATION RESPONSIVE TO THE SIGNAL ANOMALY INFORMATION

314 — IN RESPONSE TO RECEIVING THE DIAGNOSTICS INFORMATION, INITIATING AT LEAST ONE CORRECTIVE ACTION PROCEDURE

SYSTEMS AND METHODS FOR APPLYING MACHINE LEARNING BASED ANOMALY DETECTION IN A CONSTRAINED NETWORK

TECHNICAL FIELD

This disclosure relates to anomaly detection and, in particular to systems and methods for applying machine learning based anomaly detection in a constrained network.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically controls various aspects of vehicle steering (e.g., including providing steering assist to an operator of the vehicle, controlling steerable wheels of the vehicle, and the like), vehicle propulsion, vehicle braking, and the like.

Such systems may include various sensors or measuring devices that measure or monitor aspects of the systems. During operation of the vehicle, the sensors or measuring devices may generate respective signals indicating various sensed or measured values of the aspects of the systems. Such signals may indicate normal or abnormal behavior of the various aspects of the systems.

SUMMARY OF THE INVENTION

This disclosure relates generally to anomaly detection.

An aspect of the disclosed embodiments includes a method for signal anomaly detection. The method includes receiving at least one signal via a communication bus and determining, using at least one machine learning anomaly detection model, whether a value associated with the at least one signal is within a range of an expected value for the at least one signal. The method also includes, in response to a determination that the value associated with the at least one signal is not within the range of the expected value for the at least one signal, incrementing a counter, and, in response to a determination that a value of the counter is greater than or equal to a threshold value, identifying, based on the at least one signal, signal anomaly information. The method also includes communicating the signal anomaly information to a remote computing device, receiving, from the remote computing device, diagnostics information responsive to the signal anomaly information, and, in response to receiving the diagnostics information, initiating at least one corrective action procedure.

Another aspect of the disclosure embodiments includes a system for signal anomaly detection. The system includes a processor and a memory. The memory includes instructions that, when executed by the processor, cause the processor to: receive at least one signal via a communication bus; determine, using at least one machine learning anomaly detection model, whether a value associated with the at least one signal is within a range of an expected value for the at least one signal; in response to a determination that the value associated with the at least one signal is not within the range of the expected value for the at least one signal, increment a counter; in response to a determination that a value of the counter is greater than or equal to a threshold value, identify, based on the at least one signal, signal anomaly information; communicate the signal anomaly information to a remote computing device; receive, from the remote computing device, diagnostics information responsive to the signal anomaly information; and, in response to receiving the diagnostics information, initiate at least one corrective action procedure.

Another aspect of the disclosure embodiments includes an apparatus for signal anomaly detection. The apparatus includes a processor and a memory. The memory includes instructions that, when executed by the processor, cause the processor to: receive at least one signal via a communication bus; determine whether a value associated with the at least one signal is within a range of an expected value for the at least one signal; in response to a determination that the value associated with the at least one signal is not within the range of the expected value for the at least one signal, increment a counter; in response to a determination that a value of the counter is greater than or equal to a threshold value, identify, based on the at least one signal, signal anomaly information; communicate the signal anomaly information to a remote computing device; receive, from the remote computing device, diagnostics information responsive to the signal anomaly information; and, in response to the diagnostics information indicating a request for additional signal anomaly information: update at least one monitoring parameter based on the request for additional signal anomaly information; generate the additional signal anomaly information based on the updated at least one monitoring parameter; and communicate the additional signal anomaly information to the remote computing device.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is a flow diagram generally illustrating an anomaly detection method according to the principles of the present disclosure.

DETAILED DESCRIPTION

Figure 1:
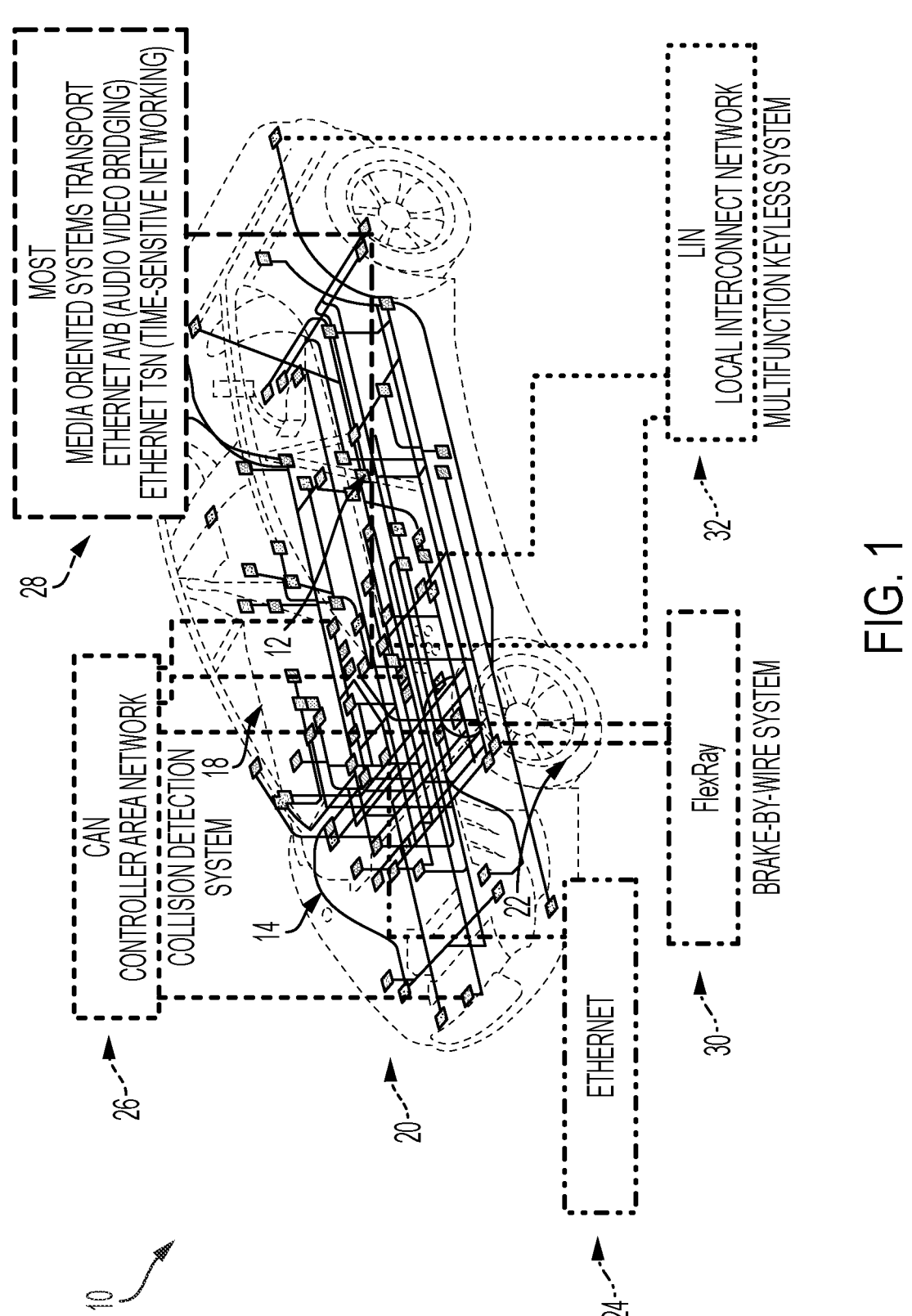
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically controls various aspects of vehicle steering (e.g., including providing steering assist to an operator of the vehicle, controlling steerable wheels of the vehicle, and the like), vehicle propulsion, vehicle braking, and the like.

Such systems may include various sensors or measuring devices that measure or monitor aspects of the systems. During operation of the vehicle, the sensors or measuring devices may generate respective signals indicating various sensed or measured values of the aspects of the systems. Such signals may indicate normal or abnormal behavior of the various aspects of the systems.

Typically, such signals are used to perform advanced analytics for vehicle health diagnostics of the vehicle. Two issues that generally arise when developing advanced analytics for vehicle health diagnostics is, first, the number of computing resources required for performing such analytics and, second, the relatively large amount of data required for performing such analytics. Typically, running the advanced analytics for vehicle health diagnostics models on a cloud computing infrastructure may solve the compute resource issue (e.g., by offloading computing resource requirements to the cloud computing infrastructure), however this approach requires large amounts of vehicle data to be transmitted wirelessly. Transmitting even a few signals at high frequency over a wireless connection (e.g., such as a mobile connection or other suitable wireless connection) is typically cost prohibitive (e.g., if done continuously).

Accordingly, systems and methods, such as those described herein, configured to limit the amount of data transferred to a cloud computing infrastructure to perform advanced analytics for vehicle diagnostics, may be desirable. In some embodiments, the systems and methods described herein may be configured to use an anomaly detection algorithm (e.g., which may include machine learning and/or classical analytical techniques) and data monitoring logic with feedback from the advanced diagnostic models running in the cloud computing infrastructure to reduce wireless (e.g., mobile and the like) data costs.

In some embodiments, the systems and methods described herein may be configured to detect anomalies using physics models that track deviations of expected output values relative to measured output values being within a threshold deviation range. Additionally, or alternatively, the systems and methods described herein may be configured to use transfer function analysis to detect frequency content deviations associated with relationships between various signals.

The systems and methods described herein may be configured to provide anomaly detection (e.g., using machine learning and/or classical analytical techniques) that includes evaluating data from a vehicle communication bus and determining whether any signals are normal or abnormal. The systems and methods described herein may be configured to, in response to a threshold being reached for a new signal abnormality, transmit the data and default logging parameters (e.g., such as signals required, sampling rate, trigger conditions, transfer interval, and the like) to the cloud computing infrastructure for analysis by higher fidelity detection algorithms.

The systems and methods described herein may be configured to may receive diagnostic information (e.g. transmitted back to the vehicle by the cloud computing infrastructure). The diagnostic information may include issue classification and severity, monitoring parameters, and the like. The systems and methods described herein may be configured to, in response to additional monitoring being required (e.g., and indicated by the diagnostics information), update data monitoring settings with new logging parameters. The systems and methods described herein may be configured to transmit additional data to the cloud computing infrastructure.

In some embodiments, the systems and methods described herein may be configured to communicate the information to the vehicle communication bus, once the diagnostic models in the cloud computing infrastructure have identified the issue. The systems and methods described herein may be configured to communicate to provide appropriate actions and information to an operator of the vehicle. The systems and methods described herein may be configured to significantly reduce onboard vehicle computing resource allocation and usage for advanced analytics for vehicle health diagnostics by limiting the in-vehicle algorithm to identifying potential abnormal conditions, rather than fully classifying the issue (e.g., with the higher level of processing being performed by the cloud computing infrastructure). Additionally, or alternatively, the systems and methods described herein may be configured to significantly reduce data transmission costs by limiting transmission of data to the cloud computing infrastructure to abnormal data (e.g., with the cloud computing infrastructure providing updates with what kind of data and/or how much data is necessary to perform such higher level processing).

The systems and methods described herein may be configured to use an anomaly detection algorithm capable of running in-vehicle to trigger data transfer to the cloud computing infrastructure where the abnormal data is then analyzed with higher fidelity and more advanced algorithms. Additionally, or alternatively, the systems and methods described herein may be configured to use feedback from the cloud computing infrastructure diagnostic models to adjust type of data transmitted to the cloud computing infrastructure to limit provided information, thus reducing data transmission costs.

In some embodiments, the systems and methods described herein may be configured to receive at least one signal via a communication bus. The systems and methods described herein may be configured to determine, using at least one machine learning anomaly detection model, whether a value associated with the at least one signal is within a range of an expected value for the at least one signal. The at least one machine learning anomaly detection model may be disposed within the vehicle. The systems and methods described herein may be configured to, in response to a determination that the value associated with the at least one signal is not within the range of the expected value for the at least one signal, increment a counter.

The systems and methods described herein may be configured to, in response to a determination that a value of the counter is greater than or equal to a threshold value, identify, based on the at least one signal, signal anomaly information. The signal anomaly information may include required signal information, sampling rate information, trigger condition information, data transfer interval information, other suitable information, or a combination thereof.

The systems and methods described herein may be configured to communicate the signal anomaly information to a remote computing device. The remote computing device may include any suitable remote computing device and/or may comprise at least a portion of a cloud computing infrastructure. The systems and methods described herein may be configured to receive, from the remote computing device, diagnostics information responsive to the signal anomaly information. The diagnostics information may include issue classification information, severity information, monitoring parameter information, other suitable information, or a combination thereof. The systems and methods described herein may be configured to, in response to receiving the diagnostics information, initiate at least one corrective action procedure.

In some embodiments, the systems and methods described herein may be configured to, in response to the diagnostics information indicating a request for additional signal anomaly information, perform the at least one corrective action procedure by updating at least one monitoring parameter based on the request for additional signal anomaly information, generating the additional signal anomaly information based on the updated at least one monitoring parameter, and communicating the additional signal anomaly information to the remote computing device.

In some embodiments, the systems and methods described herein may be configured to, in response to the diagnostics information indicating one or more error codes, perform the at least one corrective action procedure by generating one or more error signals based on the one or more error codes. In some embodiments, the at least one signal corresponds to a steering system of a vehicle.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by a operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
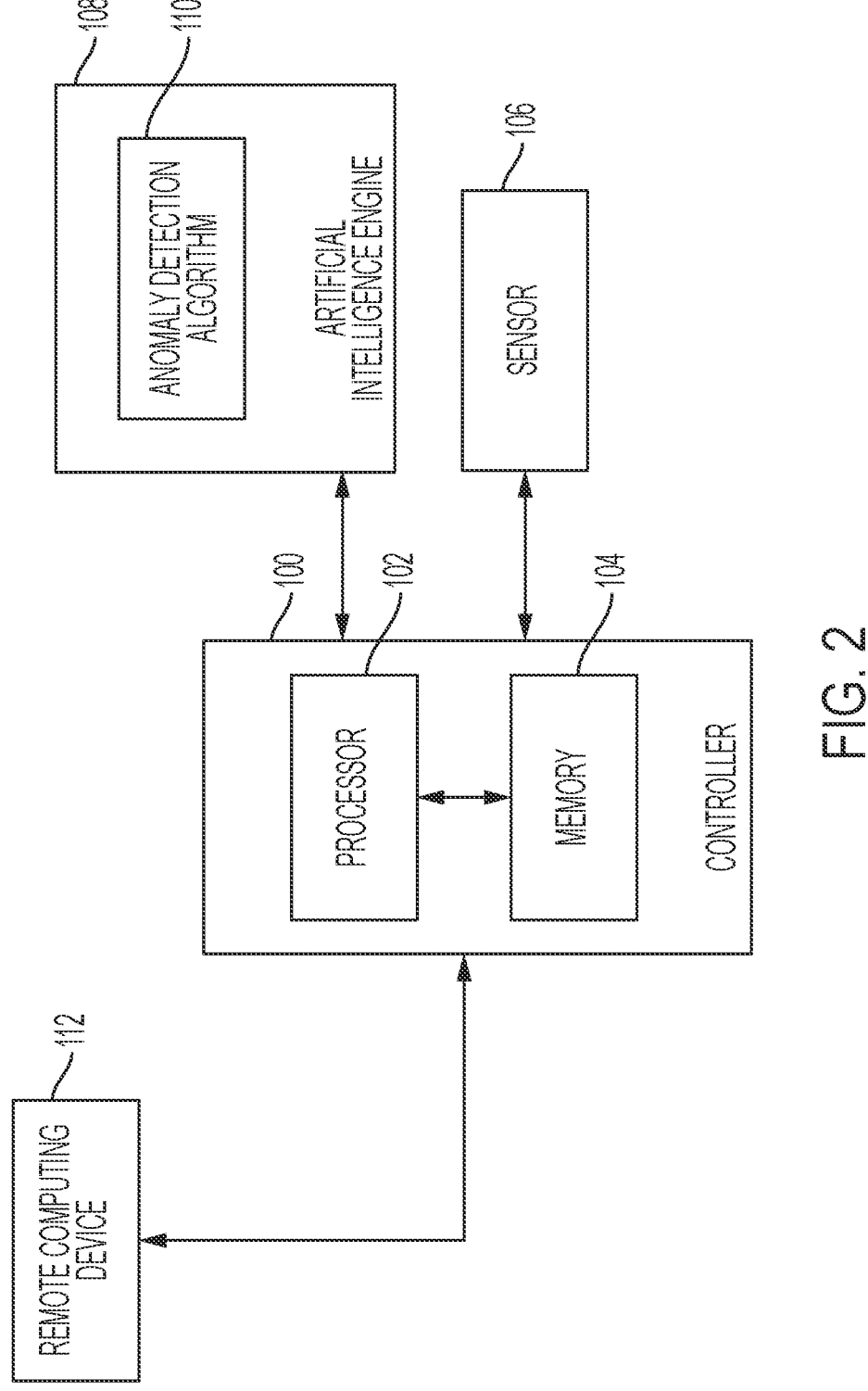
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, the controller 100 may use or include an anomaly detection algorithm, such as anomaly detection algorithm 110. The anomaly detection algorithm 110 may be configured to provide separate frequency content of a signal into order multiples of harmonics. The anomaly detection algorithm 110 may be configured to detect anomalies based on orders of the harmonics having relatively larger amplitude rations relative to other orders of harmonics.

Figure 3:
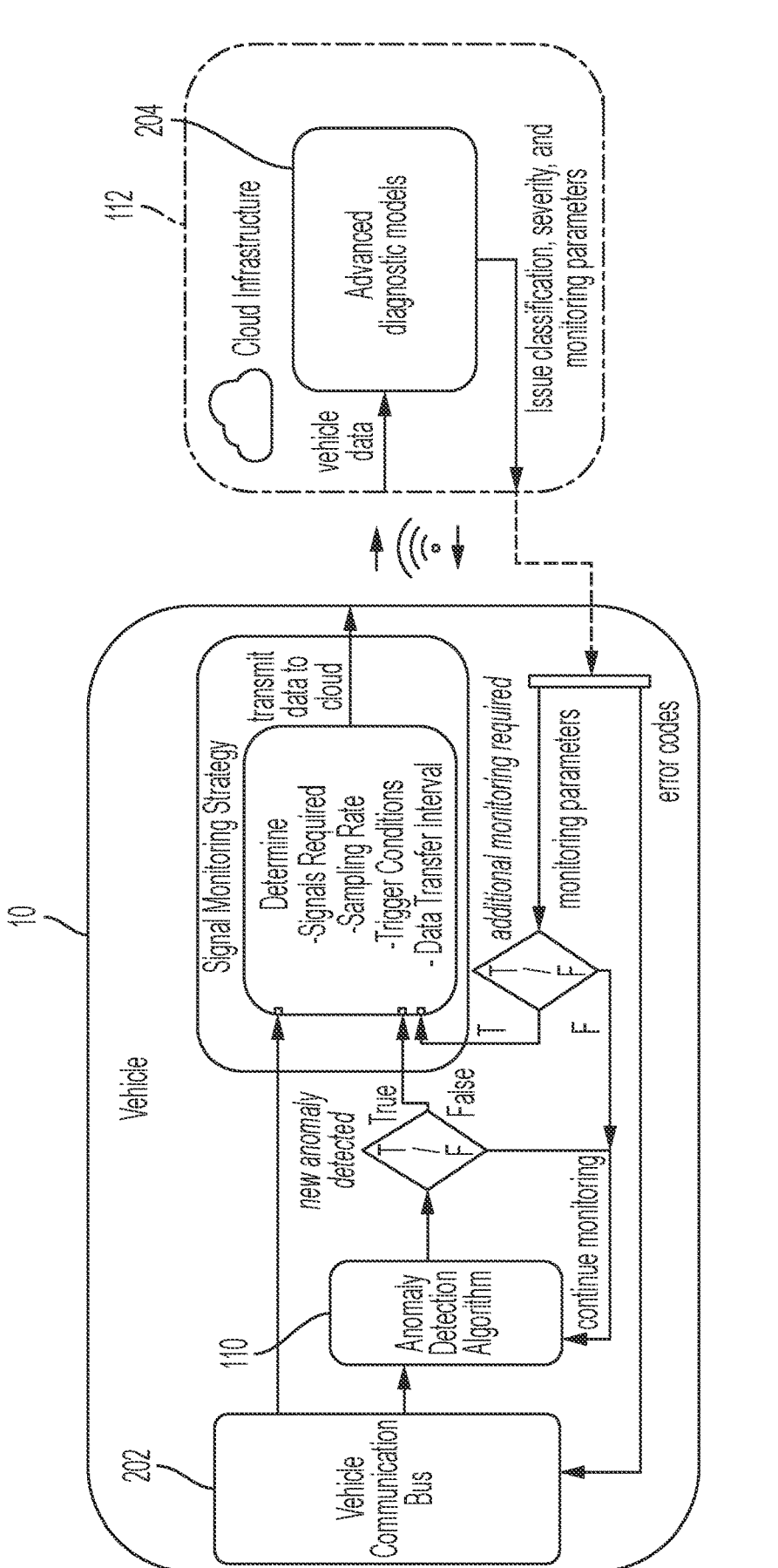
FIG. 3 generally illustrates an anomaly detection system according to the principles of the present disclosure.

In some embodiments, the anomaly detection algorithm 110 may include one or more machine learning models. For example, an artificial intelligence engine 108 configured to use the anomaly detection algorithm 110 to perform the embodiments of systems and methods described herein. The artificial intelligence engine 108 may include any suitable artificial intelligence engine and may be disposed on the vehicle 10 and/or at least partially disposed on a remotely located computer, such as the remote computing device 112 (e.g., remote located from the vehicle 10). The remote computing device 112 may include any suitable remote computing device and may comprise at least a portion of a cloud computing device or infrastructure, as is generally illustrated in FIG. 3. The controller 100 may include a training engine capable of generating one or more machine learning models (e.g., such as one or more machine learning models associated with the anomaly detection algorithm 110). Additionally, or alternatively, the machine learning model or models may be trained using any suitable training method and/or technique using any suitable computing device associated with or remote from the vehicle 10.

As is generally illustrated in FIG. 3, the controller 100 may be configured to provide signal anomaly detection, as described. The controller 100 may receive at least one signal via a communication bus 202. The vehicle communication bus 202 may include any suitable communication bus and may in communication with various systems, sensors, controllers, and the like of the vehicle 10. Additionally, or alternatively, the vehicle communications bus 202 may include features similar to those of the CAN bus 26. The controller 100 may determine, using at least one machine learning model, such as the anomaly detection algorithm 110 (e.g., which may be referred to herein as a machine learning anomaly detection model), whether a value associated with the at least one signal is within a range of an expected value for the at least one signal. For example, the anomaly detection algorithm 110 may be trained using expected values for sensors 106 corresponding to various components of the vehicle. The anomaly detection algorithm 110 may be configured to predict or identify values associated with signals that are within or outside of a range (e.g., plus or minus a percentage, value, and the like of an expected value) of the expected value for a particular sensor signal. The controller 100 may, in response to a determination that the value associated with the at least one signal is not within the range of the expected value for the at least one signal, increment a counter. Additionally, or alternatively, the controller 100 may keep track of a number of abnormal signals (e.g., signals having values that are outside of the range of a corresponding expected value) using any suitable technique in addition to or instead of incrementing a counter. The counter may be any suitable counter and may be stored in a suitable memory associated with the controller 100.

Alternatively, if the controller 100 determines that the value of the at least one signal is within the range of the expected value, the controller 100 continues monitoring signals from the vehicle communication bus 202 using the anomaly detection algorithm 110 or other suitable machine learning model or models.

The controller 100 may, in response to a determination that a value of the counter is greater than or equal to a threshold value, identify, based on the at least one signal, signal anomaly information. For example, the controller 100 may determine that a threshold number of abnormal signals has been reached and, in response to the determination, may identify various signal anomaly information. The signal anomaly information may include required signal information, sampling rate information, trigger condition information, data transfer interval information, other suitable information, or a combination thereof.

The controller 100 may communicate the signal anomaly information to a remote computing device, such as the remote computing device 112 or other suitable computing device. The remote computing device 112 may include any suitable remote computing device and/or may comprise at least a portion of a cloud computing infrastructure. The remote computing device 112 may perform or execute various advanced diagnostics models 204 (e.g., using machine learning techniques or other suitable techniques) to generate diagnostics information based on the information received from the controller 100. The controller 100 may receive, from the remote computing device 112, diagnostics information responsive to the signal anomaly information. The diagnostics information may include issue classification information, severity information, monitoring parameter information, other suitable information, or a combination thereof. The controller 100 may, in response to receiving the diagnostics information, initiate at least one corrective action procedure.

In some embodiments, the controller 100 may, in response to the diagnostics information indicating a request for additional signal anomaly information, perform the at least one corrective action procedure by updating at least one monitoring parameter based on the request for additional signal anomaly information, generating the additional signal anomaly information based on the updated at least one monitoring parameter, and communicating the additional signal anomaly information to the remote computing device 112.

In some embodiments, the controller 100 may, in response to the diagnostics information indicating one or more error codes, perform the at least one corrective action procedure by generating one or more error signals based on the one or more error codes. In some embodiments, the at least one signal corresponds to a steering system of a vehicle. The error codes may be provided to the operator visually, audibly, hapticly, or in any suitable manner. Additionally, or alternatively, the controller 100 or other controller or computing device of the vehicle 10, may provide, via the vehicle communications bus 202, information indicating one or more actions to be taken by the operator in response to the error codes.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

FIG. 4 is a flow diagram generally illustrating an anomaly detection method 300 according to the principles of the present disclosure. At 302, the method 300 receives at least one signal via a communication bus. For example, the controller 100 may receive the at least one signal via the vehicle communication bus 202.

At 304, the method 300 determines, using at least one machine learning anomaly detection model, whether a value associated with the at least one signal is within a range of an expected value for the at least one signal. For example, the controller 100 may determine, using the anomaly detection algorithm 110, whether the value associated with the at least one signal is within the range of the expected value for the at least one signal.

At 306, the method 300, in response to a determination that the value associated with the at least one signal is not within the range of the expected value for the at least one signal, increments a counter. For example, the controller 100 may, in response to the determination that the value associated with the at least one signal is not within the range of the expected value for the at least one signal, increment the counter.

At 308, the method 300, in response to a determination that a value of the counter is greater than or equal to a threshold value, identifies, based on the at least one signal, signal anomaly information. For example, the controller 100 may, in response to a determination that the value of the counter is greater than or equal to the threshold value, identify, based on the at least one signal, the signal anomaly information.

At 310, the method 300 communicates the signal anomaly information to a remote computing device. For example, the controller 100 may communicate the signal anomaly information to the remote computing device 112.

At 312, the method 300 receives, from the remote computing device, diagnostics information responsive to the signal anomaly information. For example, the controller 100 may receive, from the remote computing device 112, the diagnostics information.

At 314, the method 300, in response to receiving the diagnostics information, initiates at least one corrective action procedure. For example, the controller 100 may, in response to receiving the diagnostics information, initiate the at least one corrective action procedure.

In some embodiments, a method for signal anomaly detection includes receiving at least one signal via a communication bus and determining, using at least one machine learning anomaly detection model, whether a value associated with the at least one signal is within a range of an expected value for the at least one signal. The method also includes, in response to a determination that the value associated with the at least one signal is not within the range of the expected value for the at least one signal, incrementing a counter, and, in response to a determination that a value of the counter is greater than or equal to a threshold value, identifying, based on the at least one signal, signal anomaly information. The method also includes communicating the signal anomaly information to a remote computing device, receiving, from the remote computing device, diagnostics information responsive to the signal anomaly information, and, in response to receiving the diagnostics information, initiating at least one corrective action procedure.

In some embodiments, the signal anomaly information includes at least one of required signal information, sampling rate information, trigger condition information, and data transfer interval information. In some embodiments, the diagnostics information includes at least one of issue classification information, severity information, and monitoring parameter information. In some embodiments, the at least one corrective action procedure includes, in response to the diagnostics information indicating a request for additional signal anomaly information, updating at least one monitoring parameter based on the request for additional signal anomaly information, generating the additional signal anomaly information based on the updated at least one monitoring parameter, and communicating the additional signal anomaly information to the remote computing device. In some embodiments, the at least one corrective action procedure includes, in response to the diagnostics information indicating one or more error codes, generating one or more error signals based on the one or more error codes. In some embodiments, the at least one machine learning anomaly detection model is disposed within a vehicle. In some embodiments, the at least one signal corresponds to a steering system of a vehicle. In some embodiments, the steering system includes an electronic power steering system. In some embodiments, the remote computing device is associated with clouds computing infrastructure.

In some embodiments, a system for signal anomaly detection includes a processor and a memory. The memory includes instructions that, when executed by the processor, cause the processor to: receive at least one signal via a communication bus; determine, using at least one machine learning anomaly detection model, whether a value associated with the at least one signal is within a range of an expected value for the at least one signal; in response to a determination that the value associated with the at least one signal is not within the range of the expected value for the at least one signal, increment a counter; in response to a determination that a value of the counter is greater than or equal to a threshold value, identify, based on the at least one signal, signal anomaly information; communicate the signal anomaly information to a remote computing device; receive, from the remote computing device, diagnostics information responsive to the signal anomaly information; and, in response to receiving the diagnostics information, initiate at least one corrective action procedure.

In some embodiments, the signal anomaly information includes at least one of required signal information, sampling rate information, trigger condition information, and data transfer interval information. In some embodiments, the diagnostics information includes at least one of issue classification information, severity information, and monitoring parameter information. In some embodiments, the at least one corrective action procedure includes, in response to the diagnostics information indicating a request for additional signal anomaly information updating at least one monitoring parameter based on the request for additional signal anomaly information, generating the additional signal anomaly information based on the updated at least one monitoring parameter, and communicating the additional signal anomaly information to the remote computing device. In some embodiments, the at least one corrective action procedure includes, in response to the diagnostics information indicating one or more error codes, generating one or more error signals based on the one or more error codes. In some embodiments, the at least one machine learning anomaly detection model is disposed within a vehicle. In some embodiments, the at least one signal corresponds to a steering system of a vehicle. In some embodiments, the steering system includes an electronic power steering system. In some embodiments, the remote computing device is associated with clouds computing infrastructure.

In some embodiments, an apparatus for signal anomaly detection includes a processor and a memory. The memory includes instructions that, when executed by the processor, cause the processor to: receive at least one signal via a communication bus; determine whether a value associated with the at least one signal is within a range of an expected value for the at least one signal; in response to a determination that the value associated with the at least one signal is not within the range of the expected value for the at least one signal, increment a counter; in response to a determination that a value of the counter is greater than or equal to a threshold value, identify, based on the at least one signal, signal anomaly information; communicate the signal anomaly information to a remote computing device; receive, from the remote computing device, diagnostics information responsive to the signal anomaly information; and, in response to the diagnostics information indicating a request for additional signal anomaly information: update at least one monitoring parameter based on the request for additional signal anomaly information; generate the additional signal anomaly information based on the updated at least one monitoring parameter; and communicate the additional signal anomaly information to the remote computing device.

In some embodiments, the instructions further cause the processor to, in response to the diagnostics information indicating one or more error codes, generate one or more error signals based on the one or more error codes.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for signal anomaly detection, the method comprising:

receiving at least one signal via a communication bus of a vehicle;

determining, using at least one machine learning anomaly detection model, whether a value associated with the at least one signal is within a range of an expected value for the at least one signal;

in response to a determination that the value associated with the at least one signal is not within the range of the expected value for the at least one signal, incrementing a counter;

in response to a determination that a value of the counter is greater than or equal to a threshold value, identifying, based on the at least one signal, signal anomaly information;

communicating the signal anomaly information to a remote computing device, wherein the remote computing device is disposed remotely from the vehicle and wherein the remote computing device is configured to execute a detection algorithm having a higher fidelity than a detection algorithm disposed on the vehicle;

receiving, from the remote computing device, diagnostics information responsive to the signal anomaly information; and in response to receiving the diagnostics information, initiating at least one corrective action procedure, wherein the at least one corrective action procedure includes, in response to the diagnostics information indicating a request for additional signal anomaly information, updating at least one monitoring parameter based on the request for additional signal anomaly information, and generating the additional signal anomaly information based on the updated at least one monitoring parameter.

2. The method of claim 1, wherein the signal anomaly information includes at least one of required signal information, sampling rate information, trigger condition information, and data transfer interval information.

3. The method of claim 1, wherein the diagnostics information includes at least one of issue classification information, severity information, and monitoring parameter information.

4. The method of claim 1, wherein the at least one corrective action procedure, in response to the diagnostics information indicating a request for additional signal anomaly information, further includes:

communicating the additional signal anomaly information to the remote computing device.

5. The method of claim 1, wherein the at least one corrective action procedure includes, in response to the diagnostics information indicating one or more error codes, generating one or more error signals based on the one or more error codes.

6. The method of claim 1, wherein the at least one machine learning anomaly detection model is disposed within the vehicle.

7. The method of claim 1, wherein the at least one signal corresponds to a steering system of the vehicle.

8. The method of claim 7, wherein the steering system includes an electronic power steering system.

9. The method of claim 1, wherein the remote computing device is associated with clouds computing infrastructure.

10. A system for signal anomaly detection, the system comprising:

a processor; and a memory including instructions that, when executed by the processor, cause the processor to:

receive at least one signal via a communication bus of a vehicle;

determine, using at least one machine learning anomaly detection model, whether a value associated with the at least one signal is within a range of an expected value for the at least one signal;

in response to a determination that the value associated with the at least one signal is not within the range of the expected value for the at least one signal, increment a counter;

in response to a determination that a value of the counter is greater than or equal to a threshold value, identify, based on the at least one signal, signal anomaly information;

communicate the signal anomaly information to a remote computing device;

receive, from the remote computing device, diagnostics information responsive to the signal anomaly information, wherein the remote computing device is disposed remotely from the vehicle and wherein the remote computing device is configured to execute a detection algorithm having a higher fidelity than a detection algorithm disposed on the vehicle; and in response to receiving the diagnostics information, initiate at least one corrective action procedure, wherein the at least one corrective action procedure includes, in response to the diagnostics information indicating a request for additional signal anomaly information, updating at least one monitoring parameter based on the request for additional signal anomaly information, and generating the additional signal anomaly information based on the updated at least one monitoring parameter.

11. The system of claim 10, wherein the signal anomaly information includes at least one of required signal information, sampling rate information, trigger condition information, and data transfer interval information.

12. The system of claim 10, wherein the diagnostics information includes at least one of issue classification information, severity information, and monitoring parameter information.

13. The system of claim 10, wherein the at least one corrective action procedure, in response to the diagnostics information indicating a request for additional signal anomaly information, further includes:

communicating the additional signal anomaly information to the remote computing device.

14. The system of claim 10, wherein the at least one corrective action procedure includes, in response to the diagnostics information indicating one or more error codes, generating one or more error signals based on the one or more error codes.

15. The system of claim 10, wherein the at least one machine learning anomaly detection model is disposed within the vehicle.

16. The system of claim 10, wherein the at least one signal corresponds to a steering system of the vehicle.

17. The system of claim 16, wherein the steering system includes an electronic power steering system.

18. The system of claim 10, wherein the remote computing device is associated with clouds computing infrastructure.

19. An apparatus for signal anomaly detection, the apparatus comprising:

a processor; and a memory including instructions that, when executed by the processor, cause the processor to:

receive at least one signal via a communication bus;

determine whether a value associated with the at least one signal is within a range of an expected value for the at least one signal;

in response to a determination that the value associated with the at least one signal is not within the range of the expected value for the at least one signal, increment a counter;

in response to a determination that a value of the counter is greater than or equal to a threshold value, identify, based on the at least one signal, signal anomaly information;

communicate the signal anomaly information to a remote computing device, wherein the remote computing device is disposed remotely from the processor and wherein the remote computing device is configured to execute a detection algorithm having a higher fidelity than a detection algorithm disposed executable by the processor;

receive, from the remote computing device, diagnostics information responsive to the signal anomaly information; and in response to the diagnostics information indicating a request for additional signal anomaly information:

update at least one monitoring parameter based on the request for additional signal anomaly information;

generate the additional signal anomaly information based on the updated at least one monitoring parameter; and communicate the additional signal anomaly information to the remote computing device.

20. The apparatus of claim 19, wherein the instructions further cause the processor to, in response to the diagnostics information indicating one or more error codes, generate one or more error signals based on the one or more error codes.

\* \* \* \* \*